MICROSPHERES HAVING AN ANTIREFLECTION COATING AND THEIR USE

Filed Nov. 9, 1970

INVENTOR.
WALLACE KARL BINGHAM
BY Kinney, Alexander,
Sell, Steldt & DeLa Hunt
ATTORNEYS

United States Patent Office 3,700,478
Patented Oct. 24, 1972

3,700,478
MICROSPHERES HAVING AN ANTIREFLECTION COATING AND THEIR USE
Wallace Karl Bingham, North St. Paul, Minn., assignor to Minnesota Mining and Manufacturing Company, St. Paul, Minn.
Filed Nov. 9, 1970, Ser. No. 87,858
Int. Cl. G03b 21/60
U.S. Cl. 117—28
4 Claims

ABSTRACT OF THE DISCLOSURE

Retroreflective sheet constructions containing high index glass microspheres, which microspheres contain an antireflection coating thereon.

This invention relates to retroreflective constructions having improved optical efficiency, to novel glass microspheres and to methods for producing improved retroreflective constructions.

Efforts have been made for many years to improve the optical efficiency of retroreflective constructions, particularly those constructions utilizing small glass beads with specular reflecting material adjacent a portion of the bead surface, especially when the glass beads are exposed to air, as in the constructions described in U.S. Patent No. 3,190,178. These efforts have not produced satisfactory solutions to the problems.

Optical interference films, especially antireflection films, have previously been applied to flat surfaces and to lenses of relatively large radii of curvature, such as those used in cameras, telescopes and microscopes. These have radii of curvature ranging from a few tenths of an inch to several feet.

The theory of optical interference films has been developed and appears in many places in the optical literature. (See, for example, O. S. Heavens, Optical Properties of Thin Solid Films, pp. 56–69, Dover Publication, 1965.) However, all these developments are based on the assumption that the surfaces involved are flat, and the "division of amplitude" approach is used for reflection reducing arrangements. The nature of curved surfaces suggests that there is some radii of curvature below which that approach is invalid. On a curved surface, the angle of incidence of the light beam varies, and there is a division of the wave front. Interference by wave amplitude division and by wave front division is well distinguished in most optical texts (for example see Applied Optics and Optical Engineering, edited by Rudolph Kingslake, vol. 1, pp. 285–299, Academic Press, 1965). For clarification, as they relate to interference films on small radii of curvature surfaces, examples of these two classes of interference are shown in FIGS. 1 and 2.

FIG. 1 shows a parallel beam of light striking a double interface formed by a film of refractive index $n_2$ between media of indices $n_1$ and $n_3$. Only two incident rays, $a$ and $b$, and their reflections are shown. Actually the beam is composed of a very large number of very close parallel rays, and the total width of the beam is much greater than the thickness of the intermediate film. Upon striking the double interface, ray $a$ is divided into a transmitted ray $T_a$, a first surface reflected ray $R_{a1}$, and a second surface reflected ray $R_{a2}$. Likewise, ray $b$ is divided into $T_b$, $R_{b1}$ and $R_{b2}$. The total energy in all the transmitted rays plus the energy in all the reflected rays is equal to the total energy in all the incident rays. As shown in FIG. 1, second surface reflected ray $R_{b2}$ is parallel to and nearly coincides with first surface reflected ray $R_{a1}$. Actually, if all the incident rays in the entire beam could be drawn, a second surface reflected ray would be seen exactly coincident with and parallel to each first surface reflected ray. Thus the amplitude of the reflected beam is divided into two parts, one from the first surface and one from the second. The phase relationship between these two parts depends on the optical thickness of the film, and the amplitude of each part depends on the refractive index contrasts at the two surfaces. Since the two parts are parallel, and if the amplitudes are equal but opposite in phase, the two parts of the reflected beam will completely cancel and there will be no reflected beam in the entire region of the incident side of the film. On the other hand, if the phases are equal, the two reflected amplitudes reinforce each other, and the reflected beam will be equal in intensity to that which would exist without the intermediate film.

FIG. 2 shows an example of optical interference by wave front division, as it occurs in the classical "Fresnel mirrors" arrangement, where two reflecting surfaces $c$ and $d$ are adjacent but at slightly different angles to each other. Incident rays $a$ and $b$ each represent one of a very large number of rays in the incident beam that strikes the first or second portion of the surface, respectively. Because there is only one reflecting interface there is only one reflection for each ray, but the original wave front, shown along line XY perpendicular to the incident beam, is divided into reflected wave fronts perpendicular to $R_a$ and $R_b$ which overlap but are not parallel. $R_a$ and $R_b$ intersect at point P. Since the optical path distance from the wave front along XY to point P is in general different for ray $b$ than for ray $a$, the two rays will interfere constructively or destructively, depending on the path difference. Other pairs of reflected rays from the two portions of the wave front will intersect at other points in the region, and will interfere constructively or destructively with each other, depending on their optical path differences. The result will be a pattern of bright and dark lines in the region of reflectance. Although the reflected energy will be thus non-uniformly distributed, the total amount of reflected energy will be unaffected by the wave front division.

When a beam of light strikes a pair of curved surfaces, separated by a film of intermediate refractive index, such as on a lens of small radius of curvature, characteristics of both amplitude division and wave front division may occur. This is illustrated in FIG. 3. Reflection takes place at both surfaces, thus dividing the amplitudes, but because of the curvature of the surfaces, the reflected rays are not exactly parallel to each other. Since the exact parallelism theoretically required for reduction in the total amount of reflected energy does not exist, and the rays in general intersect each other, an intensity distribution pattern develops. One would expect that this would show up as a progressively increasing error between calculated and experimental results as the lens radius of curvature is decreased. This would be especially true with lenticular retroreflective constructions, which are very sensitive to small changes in angle. Heretofore it has been found empirically that antireflection films are beneficial down to radii of curvature in the neighborhod of 0.1 inch (2.5 mm.), but the theory as developed in the literature would not predict that antireflective films would be effective at smaller radii of curvature and indeed the predicted intensity distribution patterns would suggest that antireflection films lose their effectiveness. Lenticular retroreflective material uses lenses with radii of curvature of only .002 inch and less. Both the difficulty of application and serious questions about the probable effectiveness of antireflection coatings to reduce undesirable reflection losses at the front surfaces of such small lenses have prevented their use on lenticular retroreflective constructions heretofore. It has now been found that optical antireflection films can be applied to lenticular retroreflective constructions and are surprisingly effective in increasing retroreflective efficiency, even for lenses with radii of curvature as small as .001 inch (0.025 mm.).

Figure 1:
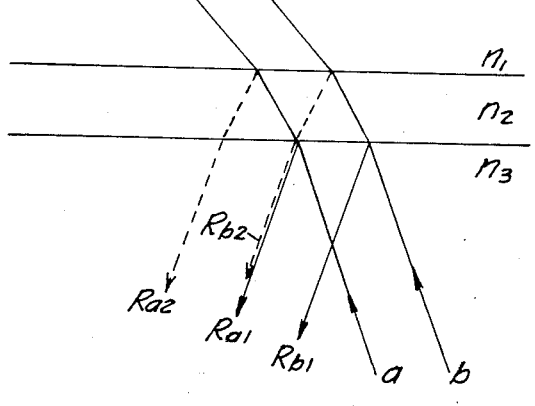
Figure 2:
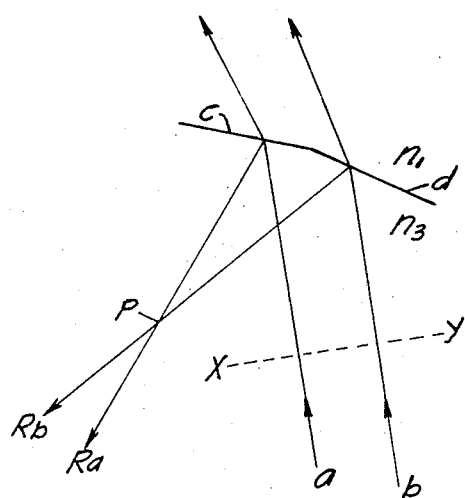
Figure 3:
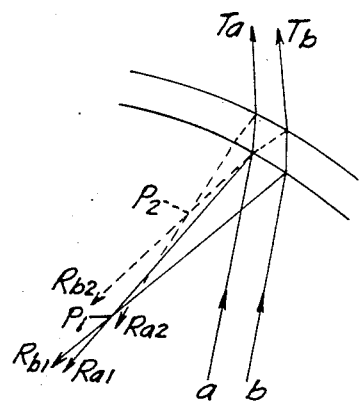
Figure 4:
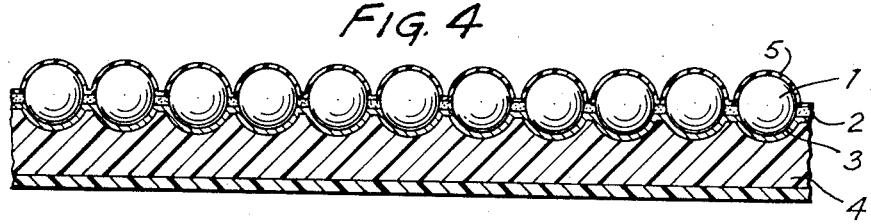
FIG. 4 represents a cross-sectional schematic view of an exposed bead retroreflective sheeting of this invention.
Figure 5:
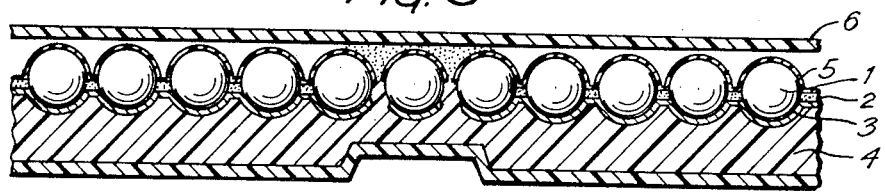
FIG. 5 represents a cross-sectional schematic view of a retroreflective sheeting of the invention in which the beads are located in sealed sections having a transparent cover film 6 thereover.

According to this invention, illustrated schematically in FIGS. 4 and 5, applicant has found that the optical efficiency of retroreflective (i.e. reflexreflective) constructions containing small spherical lens elements 1, such as glass beads with a refractive index above about 1.80 (preferably from 1.80 to about 2.05) and a diameter from 10 to 200 microns (preferably from 25 to 75 microns) partially embedded in a binder 2 and backed by a specular reflecting material 3 and a support 4 can be significantly improved if a thin transparent film 5 of a lower refractive index material, e.g. a refractive index from about 1.10 to about 1.83 (preferably below 1.45) is provided on at least that portion (e.g. at least about a hemispherical portion) of the bead surface exposed to incident light, said transparent film having an optical thickness corresponding to odd numbered multiples of one-quarter wavelength (i.e. 1, 3, 5, 7 . . . etc.) of the incident light in the range of ultraviolet to infrared (i.e. 3800 angstroms to 10,000 angstroms wavelength). Both organic and inorganic materials meeting these criteria may be used. When the incident light extends primarily throughout the visible range, the determination of the thickness may conveniently be based on or about the sodium line in the spectrum, i.e. about 5,900 angstroms, since the sodium line is generally considered to fall in the dominant portion of the visible light spectrum. In order to determine the optimum refractive index for the thin, transparent antireflection film or coating, the following formula may be used:

$$R = \left(\frac{n_1^2 - n_0 n_2}{n_1^2 + n_0 n_2}\right)^2$$

Wherein R is the reflectance loss, $n_0$ is the refractive index of the material in contact with the thin transparent coating ($n_0=1$ when this material is air), $n_2$ is the refractive index of the bead or sphere and $n_1$ is the refractive index of the thin transparent coating, the refractive index relationship being $n_0:n_1:n_2$. This equation applies to a coating of about one-quarter wavelength thickness, and the useful limits for the refractive index of the material in the thin coating can be determined by establishing the maximum amount of reflectance loss that can be tolerated, e.g. not in excess of about 0.06, preferably below 0.04 and most preferably approaching zero. The above formula and its derivation is found in Physics of Thin Films, vol. 2, pp. 239-304 (edited by Georg Hass and Rudolph E. Thun, Academic Press, New York, 1964).

A variety of inorganic transparent materials meeting the above refractive index criteria have been described in the literature, including such material as cryolite, lithium fluoride, silicon oxides and magnesium fluoride. The refractive indices of various useful transparent materials in thin film form is reported in Thin Film Phenomena, K. L. Chopra, p. 750 (McGraw Hill Book Company, New York, 1969). Many of the materials have been suggested for use on photographic lenses, telescope lenses and the like, but to the best of applicant's knowledge they have never been considered for use in retroreflective constructions where extremely small glass beads are employed as lens elements. They may be deposited onto the glass beads as a thin, relatively uniform, transparent layer by such methods as chemical treatment, solution coating, chemical vapor deposition, vacuum deposition, and liquid hydrolysis. Although the beads are normally treated while embedded in a retroreflective sheet or film, thereby providing the antireflection layer on the exposed portions of the bead surfaces, they may also be coated separately with the antireflection material before their incorporation into the retroreflective construction. When the layer is formed by vapor deposition in a vacuum (e.g. vapor deposition of cryolite), the layer thickness on a small bead would be expected to vary over its exposed surface, with the thickest deposit occurring at the outermost portion where the vapor is deposited normal to the bead surface. It is interesting to find that such variation either does not occur or, if it occurs, does not prevent a noticeable improvement in optical efficiency.

The following examples will illustrate the practice of this invention.

EXAMPLE 1

Glass beads having an average diameter of 55 microns and a refractive index of 1.93 were embedded up to about one-third of their diameter into the polyethylene layer of polyethylene coated paper. This procedure was carried out in an oven at about 280° F. (138° C.). The resulting beaded web was then vacuum vapor coated with aluminum on the beaded side to provide a mirror or specularly reflecting coating on the exposed or unembedded surfaces of the glass beads. This mirror coat was then knife coated with a 12 mil (wet thickness) layer of a white bead bond solution containing an acrylic resin, plasticizer and titanium dioxide pigment. After the bead bond had been cured at 150° F. (66° C.) for 10 minutes and then at 200° F. (93° C.) for 12 minutes, the cured bead bond surface was laminated to a pressure sensitive adhesive coated, one-half mil polyester film at 80 pounds (5.6 kg./cm.$^2$) pressure and at room temperature. The laminate was stripped from the original polyethylene coated paper, forming a retroreflective sheeting.

A sample of the above sheeting was masked over half of its beaded surface, and the unmasked portion was vacuum vapor coated with cryolite to an optical thickness producing the first observed maximum in retroreflective intensity (corresponding to the effect obtained with an optical thickness of about one-quarter wavelength of 5900 angstrom light). Following this vapor coating step, a 3 mil (0.75 mm.) clear polymethylmethacrylate film was heat sealed at 300° F. (149° C.) and 20 p.s.i. (1.4 kg./cm.$^2$) in a hexagonal pattern, each hexagonal element being about 3.2 mm. in width. Such a construction and its preparation, except for the Na$_3$AlF$_6$ coating, is similar to that described in US. Pat. No. 3,190,178.

The final product is a flexible retroreflective sheeting. That half of the sheet which did not contain the cryolite coating had a retroreflective intensity of 280 candella per square meter per lux while the half with the cryolite coating had a retroreflective intensity of 360 candella per square meter per lux, representing an increase of 28.5%. At least a 9% increase, usually at least a 10% or 15% increase, in retroreflective intensity can be achieved in the practice of this invention. The daytime appearance of the coated portion of the sheeting is essentially the same as the uncoated portion.

EXAMPLE 2

In still another example, a paper web was coated with a 42% solids solution of rubber grade styrene in xylol. The solution also contained benzoyl peroxide (0.19%) and ditertiary butyl peroxide (0.26%). The coating weight was 5.5 to 7.0 grains (wet weight) per 24 square inches (155 square centimeters), and the cure was effected at 200–225° F. (93–107° C.) for 1–2 minutes, producing a polystyrene coated release paper. A 16–19 grain per 155 cm.$^2$ wet coating of the following pigmented composition was then coated onto the polystyrene side of the release paper and cured at 200–300° F. (93–149° C.) for 6–8 minutes.

| | Parts by weight |
|---|---|
| Polyvinyl butyral | 14.5 |
| Cellosolve | 73.6 |
| Water | 8.7 |
| Carbon black | 0.45 |
| Non-oxidizing long coconut oil alkyd ("Aroplaz 1351" a trademarked product of Ashland Chemical Company) | 2.75 |

After this coating was cured, a third coating was deposited at 8–10 grain (per 155 cm.²) wet coating, using the following formulation.

| | Parts by weight |
|---|---|
| Oil free alkyd type non-drying polyester (60% solids in xylol), max. acid value=25, Gardner-Holdt viscosity (25° C.)=X-Z ("Aroplaz 6201," a trademarked product of Ashland Chemical Company) | 69.0 |
| Butylated melamine—formaldehyde resin solution of 60% solids in a solvent composed of equal parts butanol and xylol ("Resimene 881," a trademarked product of Monsanto Chemical Company) | 15.0 |
| The acetate of the monobutyl ether of diethylene glycol | 8.5 |
| Non-oxidizing long coconut oil alkyl ("Aroplaz 1351") | 7.0 |
| Carbon black | 0.5 |

The cure was effected at 270–300° F. (132–149° C.) for 8–10 minutes. Glass beads of 1.93 refractive index which had been concentrically coated with metallic silver were cascade coated onto the coating while it was tacky and permitted to sink to approximately one-half their diameters just prior to curing of the resin. The paper web was removed, and a pressure sensitive adhesive carried on a polyethylene coated release paper was then laminated to the surface exposed thereby. The entire construction was then passed through a dilute solution of sulfuric acid and potassium dichromate to remove the silver from the front or exposed face, and the construction was washed with clean water and dried.

The beaded side of the construction was subjected to a vacuum vapor deposition of $Na_3AlF_6$ to an optical thickness of about one-quarter wavelength (5900 angstrom light), as in Example 1. Prior to the deposition a portion of the surface was masked to prevent the deposite from forming on the beads in the masked area.

The final product was a highly retroreflective flexible, exposed bead sheeting. The vapor coated portion of the sheet had a retroreflective intensity of 492 candella per square meter per lux, while the uncoated portion had a retroreflective intensity of 410 candella per square meter per lux, representing an increase of about 20%. The coated portion had a slightly darker daytime appearance than the uncoated control.

The following test procedure was used in determining retroreflective intensity. A light projector having a maximum lens diameter of 1 inch (2.54 cm.) and capable of projecting a uniform light is used to illuminate the sample. The light falling on the sample has a color temperature of 2854° K. The light reflected from the test surface is measured with a photoelectric receiver whose response has been corrected for the color sensitivity of the average photopic human eye. The dimensions of the active area on the receiver are such that no point on the perimeter is more than ½ inch (1.27 cm.) from the center. Samples were mounted on a flat black test surface approximately 3 feet square (0.836 square meter). The sample was 50 feet (15.25 meters) from the projector lens and the receiver. The area of the test sample was one square foot (0.0929 square meter). The illumination should be incident on the test surface at an angle of 5 degrees. The illumination resulting from reflection from the test surface is measured at 0.2° divergence angle, the divergence angle being the angle subtended at this specimen position by a line from the source to the specimen and a line from the receiver to the specimen. The retroreflective intensity, in candlepower per square foot per foot candle (equivalent to candella per square meter per lux), was then computed from the following equation:

$$RI = \frac{E_r(d^2)}{E_s(A)}$$

Where:

RI=retroreflective intensity
$E_r$=illumination incident upon the receiver
$E_s$=illumination incident upon a plane perpendicular to the incident ray at the specimen position, measured in the same units as $E_r$
$d$=distance in feet from the speciment to the projector
$A$=Area in square feet of the test surface This retroreflective intensity represents the intensity of a light beam which has passed into and out of a retroreflective glass bead, so that any surface or interfacial losses are thus doubled. The above procedure is embodied in the United States Federal Specification No. L-S-300A (Jan. 7, 1970) as a test for "reflective intensity."

If desired, the antireflection coatings may be provided on the embedded or rear portion of the glass beads as well as on the exposed portions of the bead surface at the air-bead interface, and the beads may thus be complete or concentrically coated with the antireflection material. Such coatings may also be advantageously used when the glass bead surface is exposed to a relatively low refractive index material other than air, including low refractive index polymers, etc., provided the value for $$\frac{n_1}{\sqrt{n_0 n_2}}$$

is greater than 0.7 and less than 1.4, where $n_0$, $n_1$ and $n_2$ are as defined above.

What is claimed is:

1. In a retroreflective sheet construction containing a layer of glass beads having a refractive index above about 1.8 and a diameter from about 10 to about 200 microns and a specular reflecting material adjacent to said glass beads, the improvement which comprises an antireflection coating on at least about a hemispherical portion of the surface of said beads which is exposed to incident light, said coating comprising a transparent vapor deposited inorganic film having a refractive index $n_1$ below 1.45 as determined by the formula $$R = \left(\frac{n_1^2 - n_0 n_2}{n_1^2 + n_0 n^2}\right)^2$$

where $n_2$ is the refractive index of the glass bead in contact with one face of said transparent film, $n_0$ is the refractive index of the material in contact with the other face of said transparent film, and R is zero to 0.06, and said coating having an optical thickness corresponding to an odd-numbered multiple of one-quarter wavelength of incident light of about 5900 angstroms.

2. The retroreflective sheet construction of claim 1 in which said glass beads are partially embedded in a substrate with specular reflecting material adjacent the embedded portions of said beads.

3. The retroreflective sheet construction of claim 1 in which the beads are located in sealed sections having a transparent cover film thereover.

4. The retroreflective sheet construction of claim 1 in which said construction has an improvement in retroreflective intensity of at least 9% attributable to said antireflection coating.

(References on following page)

References Cited

UNITED STATES PATENTS

| | | | |
|---|---|---|---|
| 3,552,822 | 1/1971 | Altman | 117—333 |
| 3,176,584 | 4/1965 | De Vries et al. | 117—27 |
| 2,963,378 | 12/1960 | Palmquist et al. | 117—27 |
| 3,252,376 | 5/1966 | De Vries | 117—27 |
| 3,013,893 | 12/1961 | Olson et al. | 117—27 |
| 3,025,764 | 3/1962 | McKenzie | 117—100 |
| 3,110,614 | 11/1963 | De Vries | 117—27 X |
| 3,286,604 | 11/1966 | De Vries | 117—100 X |
| 3,033,701 | 5/1962 | Wozniak | 117—106 X |
| 3,190,178 | 6/1965 | McKenzie | 161—408 X |

WILLIAM D. MARTIN, Primary Examiner

M. R. P. PERRONE, Jr., Assistant Examiner

U.S. Cl. X.R.

117—27, 33.3, 37 R, 100 S, 106 R, 107, 159; 161—162; 350—126

UNITED STATES PATENT OFFICE
CERTIFICATE OF CORRECTION

Patent No. 3,700,478        Dated October 24, 1972

Inventor(s) Wallace Karl Bingham

It is certified that error appears in the above-identified patent and that said Letters Patent are hereby corrected as shown below:

Column 3, line 51: "$n_0:n_1:n_2$" should read -- $n_0 < n_1 < n_2$ --

Column 4, line 47: "(0.75 mm.)" should read -- (0.075 mm.) --

Column 6, lines 53-55: (Claim 1)

$$"R = \left( \frac{n_1^2 - n_0 n_2}{n_1^2 + n_0 n^2} \right)^2 "$$ should read $$-- R = \left( \frac{n_1^2 - n_0 n_2}{n_1^2 + n_0 n_2} \right)^2 --$$

Signed and sealed this 1st day of October 1974.

(SEAL)
Attest:

McCOY M. GIBSON JR.
Attesting Officer

C. MARSHALL DANN
Commissioner of Patents